Patented Nov. 4, 1941

2,261,260

UNITED STATES PATENT OFFICE 2,261,260

COATING COMPOSITION AND METHOD OF MAKING THE SAME

Charles E. Kraus, Sparks, Md.

No Drawing. Application April 22, 1939,
Serial No. 269,531

12 Claims. (Cl. 106—84)

This invention relates to a coating composition and the process of making the composition, and more particularly to a fireproof paint for coating products made of fibro-cement, Portland cement, gypsum, earthenware, or ferrous metals, as well as for coating various other materials.

The coating composition, when cured, forms a firm, hard coating which is highly tenacious, which will not peel or chip off or develop cracks in use, which is insoluble in water, and which is capable of withstanding the effects of weather. It may be more or less lustrous, or it may be dull and substantially lusterless depending upon the use for which it is intended.

A characteristic feature of the composition is that it possesses high thixotropic properties. These properties prevent the pigment from settling out in the package, and also prevent the pigment from settling out when a film is applied to an object, resulting in a more homogeneous coating.

The coating composition may be of a somewhat viscous or pasty consistency, and may be applied by spraying, brushing, dipping or in other manners. After application, the coating composition is preferably cured or set by heat.

In the preparation of the vehicle I employ a colloidal mineral matter of the character set forth, and which may be made according to the process described in my copending application Serial No. 153,380 (Patent No. 2,182,086). This material is an earthy mineral substance of the nature of the clay known as halloysite but differing therefrom in that it is naturally impregnated with oil and is dark in color. The principal ingredients of the dehydrated material are silica (SiO₂, about 44%) and alumina (Al₂O₃, about 39%). The material is believed to be of a latently colloidal nature although, probably because of the presence of the oil, no colloidal properties are apparent in the raw material.

The inherent colloidal properties of the material are developed when the oil is released. The oil may be released in the manner described in my aforesaid application or in any other known manner. The released oil may either be permitted to remain in the mixture or it may be removed, by any known method, depending upon whether it is desired to make a coating composition of dark or of light color. In the latter case the oil is removed.

Water and sodium hydroxide, in suitable proportions, are added to the clay and the mixture is heated preferably to about 210° F., although higher temperatures may be employed. Heating is necessary to break the oil film and release the imprisoned colloids.

The resultant of this step of the process, which I term "step 1," is a colloidal solution of aluminum silicate which is substantially wholly colloidal and has a particle size ranging from 0.1 micron to 5 microns, the major portion being between 0.1 to 1.0 micron. It has a melting point of not less than 3000° F., and is irreversible, that is to say, it will not revert to the colloidal state after being dried. This colloidal mass possesses high thixotropic properties in that when at rest at ordinary atmospheric temperatures it is quite a heavy jellylike mass but when stirred it will flow freely.

As another step in the preparation of the vehicle, which I have termed "step 2," I prepare a type of reversible or partially reversible colloidal aluminum silicate having low thixotropic properties. In preparing the latter type of colloidal matter, I employ an halloysite which is not impregnated with oil and pulverize it to an impalpable powder, and heat it in the presence of an alkaline solution, such for example as ammonium hydroxide (26° Baumé), to 210° F., for about one hour more or less. Higher temperatures may be used upon heating in an autoclave. While still hot, the mass is ground in a mill to colloidal dimensions. The resultant mass has the appearance of cream and has low thixotropic properties. In some instances bentonite may be substituted for halloysite as the starting material in the preparation of this second type of colloidal matter.

As "step 3" in the preparation of the vehicle, I take a part of the colloidal matter of low thixotropic properties described in "step 2" and add an amorphous silica, or a silica of the finest grain size, water, and caustic soda. This mixture is heated, preferably in an autoclave, to about 212° to 240° F. for about one hour, to form soluble aluminates and silicates in this product. Either sodium aluminate or sodium silicate, or both, made by other processes, may be employed instead of forming them in the manner herein described.

"Step 4" in making the vehicle is to form a mixture in which the resultants of steps 1, 2 and 3 are combined in various proportions forming a compound of colloidal aluminum silicate of high thixotropic properties, colloidal aluminum silicate of low thixotropic properties, and soluble aluminates and soluble silicates. To this compound I add an organic agglutinating or homogenizing agent such as naphthalene, resinous substances, asphalt emulsion, pulverized bitumen, wax, coal tar, or other suitable organic material that will soften at a temperature ranging from about 140° to 500° F. The functions of this agent are to lower the effective temperature at which the silicate will become insoluble; to produce microscopic pores or openings in the coating during the early stages of its setting or curing, thereby permitting the moisture and gases to escape without forming cracks or blisters; and subsequently, in the later stages of setting or curing, to cause the composition to film over and to agglutinate the colloids and the silicate of soda into a homogeneous film, closing the pores and forming a substantially imperforate coating.

The vehicle as above described is diluted with water to the desired consistency and suitable colored pigments, preferably metallic pigments, are added to give various shades of color, after which the entire mass is ground to the proper degree of fineness, preferably through a paint mill.

If the film is too hard, I add a small percentage of flocculating ingredient such as red lead, white lead, zinc oxide, alcohol, or a mild acid solution in small percentages after the fourth step. A mild solution of any suitable acid, either mineral or organic, may be used, such, for example, as a 5% sulphuric acid solution, a 5% hydrochloric acid solution, or a 10% tannic acid solution.

The following are examples of the formulae that may be used in the several steps. It is to be understood, however, that the percentages stated are subject to variation.

Per cent by weight

Step 1:
- Naturally oil impregnated halloysite____ 49.0
- Water _____ 49.0
- Sodium hydroxide_____ 2.0

Step 2:
- Pulverized halloysite (unimpregnated with oil_____ 50.0
- Ammonium hydroxide (26° Baumé)___ 1.0
- Water _____ 49.0

Step 3:
- Product of step 2_____ 7.0
- Fine silica_____ 38.0
- Sodium hydroxide_____ 9.0
- Water _____ 46.0

Step 4:
- Product of step 1_____ 4.0
- Product of step 2_____ 4.0
- Product of step 3_____ 50.0
- Water _____ 23.0
- Rosin _____ 4.0
- Pigment _____ 15.0

The foregoing proportions, and the sequence of steps, are not critical. It will be apparent to one skilled in the art that the above described examples may be widely varied without departing from the invention.

What I claim is:

1. A coating composition of high thixotropic properties comprising an irreversible colloidal clay having high thixotropic properties, a partly reversible colloidal clay having low thixotropic properties, water soluble silicate of soda, a pigment, and an agglutinating agent having a melting point ranging from about 140° to 500° F.

2. A coating composition of high thixotropic properties, comprising two clays of different characteristics as to reversibility reduced to colloidal dimensions, water soluble silicate of soda, pigment, and an organic agglutinating agent having a softening point ranging from about 140° to 500° F.

3. A coating composition of high thixotropic properties comprising a plurality of clays of different characteristics as to reversibility reduced to colloidal dimensions, water soluble silicate of soda, pigment, and naphthalene.

4. A method of making a coating composition of high thixotropic properties which consists in taking two clays of halloysite type, one naturally impregnated with oil, and the other free of oil, both containing silica and alumina as their principal ingredients, releasing the oil from the oil impregnated clay, reducing both clays to colloidal size, converting the silica and the alumina of a part of the clay free from oil into soluble aluminates and silicates, adding an organic agglutinating agent having a melting point ranging from about 140° to 500° F., and mixing the ingredients in the presence of water.

5. A method of making a coating composition of high thixotropic properties which consists in taking two clays of halloysite type, one naturally impregnated with oil, and the other free of oil, both containing silica and alumina as their principal ingredients, releasing the oil from the oil impregnated clay, reducing both clays to colloidal size, adding water soluble silicates, adding an organic agglutinating agent having a melting point ranging from about 140° to 500° F., and mixing the ingredients in the presence of water.

6. A coating composition of high thixotropic properties comprising an irreversible colloidal clay comprising silica and alumina as its principal ingredients, a reversible or partly reversible colloidal clay containing alumina and silica as its principal ingredients, soluble aluminate and soluble silicate, and an agglutinating agent having a melting point ranging from about 140° to 500° F.

7. A coating composition of high thixotropic properties comprising an irreversible colloidal clay comprising silica and alumina as its principal ingredients, a reversible or partly reversible colloidal clay containing alumina and silica as its principal ingredients, water soluble silicate, and an agglutinating agent having a melting point ranging from about 140° to 500° F.

8. A coating composition of high thixotropic properties comprising a naturally oil-impregnated irreversible clay in colloidal condition, a reversible clay unimpregnated with oil in colloidal condition, water soluble silicates, and an agglutinating agent having a melting point ranging from about 140° to 500° F.

9. A coating composition of high thixotropic properties comprising bentonite, a clay containing silica and alumina as its principal ingredients in irreversible colloidal condition, and an agglutinating agent having a melting point ranging from about 140° to 500° F.

10. A coating composition of high thixotropic properties comprising clay containing alumina and silica as its principal ingredients in colloidal condition, water soluble silicates, and an agglutinating agent having a melting point ranging from about 140° to 500° F.

11. A coating composition of high thixotropic properties comprising a clay containing alumina and silica as its principal ingredients in irreversible colloidal condition, a clay containing alumina and silica as its principal ingredients in reversible or partly reversible colloidal condition, water soluble silicates, naphthalene, and a pigment.

12. A coating composition of high thixotropic properties comprising halloysite containing alumina and silica as its principal ingredients in colloidal condition, water soluble silicates, naphthalene, and a pigment.

CHARLES E. KRAUS.